Patented Aug. 25, 1925.

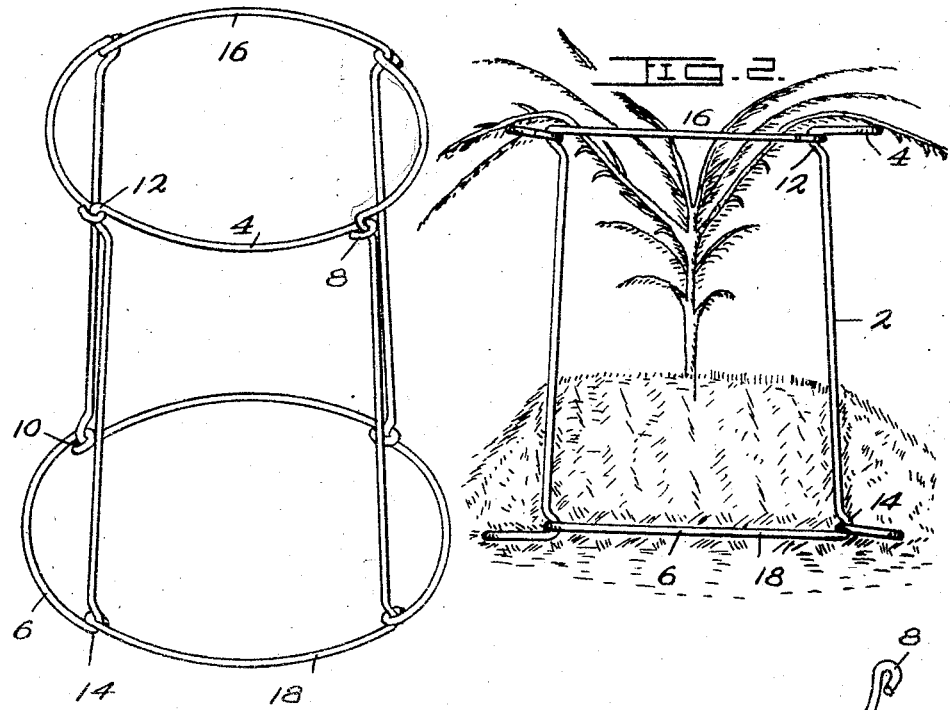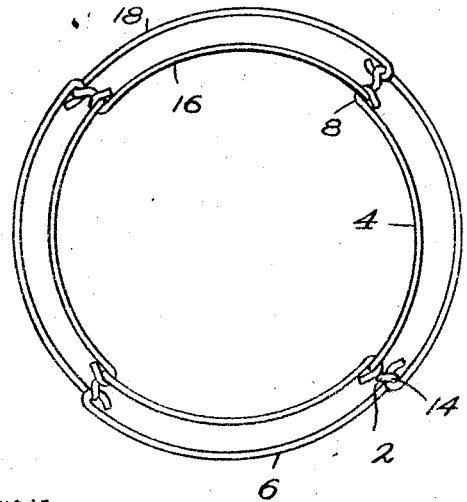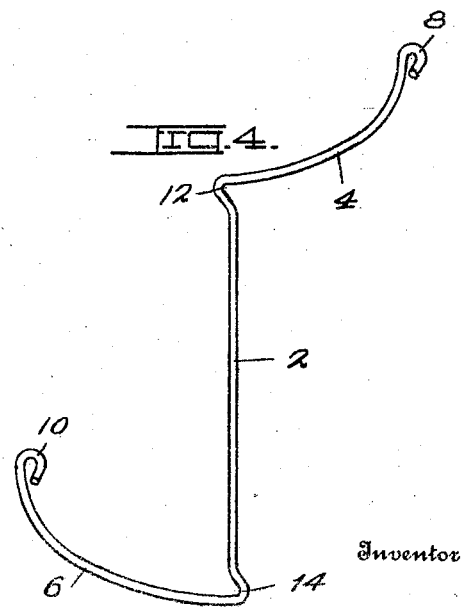

1,550,708

UNITED STATES PATENT OFFICE.

GERARDUS ROZENDAL, OF LEAVENWORTH, KANSAS.

PLANT SUPPORTER.

Application filed January 13, 1925. Serial No. 2,161.

*To all whom it may concern:*

Be it known that I, GERARDUS ROZENDAL, a citizen of the United States, residing at Leavenworth, in the county of Leavenworth and State of Kansas, have invented certain new and useful Improvements in Plant Supporters, of which the following is a specification.

My invention relates to improvements in plant supporters and while it may be employed to advantage in supporting various kinds of growing vegetables and flowers, it is especially efficient in supporting tomato plants, preventing the branches thereof from splitting or breaking and holding them above the ground so that cultivation may be carried on without hindrance; all of which materially contributes to the production of a heavy crop of good quality.

A further object is to provide a plant supporter which may be placed in position around young plants at less expenditure of time and labor than the stakes usually employed can be driven into the ground and the plants tied thereto for support.

A further object is to provide a plant supporter which can be readily set over small plants without disconnecting or opening any part of said supporter and which may be firmly anchored in the ground and thereby prevent the plants from being blown down, or broken, by high winds.

A further object is to provide a plant supporter consisting of a plurality of units all of which are alike in construction and form and can be readily assembled for use without the employment of extraneous fastening devices.

In order that the invention may be fully understood, reference will now be had to the accompanying drawing, in which:

Fig. 1 is a perspective view of the complete plant supporter.

Fig. 2 is a side elevation of the plant supporter in position around a plant.

Fig. 3 is a plan view of the plant supporter.

Fig. 4 is a detail perspective view of one of the units entering into the construction of the plant supporter.

In carrying out the invention I employ any desired number of wire units, which as above stated, are alike in construction and form.

As shown more clearly by Fig. 4, each unit consists of a standard 2, and upper and lower curved members 4 and 6, extending in opposite directions to each other and terminating in hooks 8 and 10, respectively. Eyes 12 and 14 are formed at the juncture of the standard 2 with the members 4 and 6, to receive the hooks 8 and 10, respectively, of companion units.

In practice a plant supporter of any suitable diameter may be readily assembled by using the proper number of units, which as above stated, are connected by engaging the hooks 8 and 10 with the eyes 12 and 14, respectively, of the companion units. When thus assembled the different units brace each other and the upper curved members 4 constitute a rim 16 which supports the branches of the plant as shown by Fig. 2, the lower curved members 6 constituting a base 18 which may be anchored in the ground by hoeing the soil up around the plant as shown by Fig. 2. The rim 16 is of less diameter than the base 18, so that the plant supporters may be nested together when not in use, for transportation or storage.

From the foregoing description, taken in connection with the drawing, it is apparent that I have provided a plant supporter embodying the advantages above pointed out, and while I have shown and described the preferred form of the device, I reserve the right to such other forms and modifications thereof as properly fall within the spirit and scope of the invention as claimed.

Having thus described my invention, what I claim and desire to secure by Letters Patent, is:

1. A plant supporter consisting of a suitable number of units, each unit comprising a standard having upper and lower eyes and an upper member and a lower member extending in different directions to each other from said eyes and terminating in fastening means which engage the respective eyes of the companion units.

2. In a plant supporter, a unit comprising a standard provided at its upper end with a curved rim member terminating in an integral fastening device, and a curved base member extending from the bottom of said standard in a different direction from said rim member and terminating in an integral fastening device.

In testimony whereof I affix my signature.

GERARDUS ROZENDAL.